United States Patent
Nakajima et al.

(10) Patent No.: US 11,440,840 B2
(45) Date of Patent: Sep. 13, 2022

(54) LIGHT IRRADIATION DEVICE

(71) Applicant: USHIO DENKI KABUSHIKI KAISHA, Tokyo (JP)

(72) Inventors: Toshihiro Nakajima, Tokyo (JP); Kazuhiko Shinoda, Tokyo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 864 days.

(21) Appl. No.: 16/329,359

(22) PCT Filed: Aug. 31, 2017

(86) PCT No.: PCT/JP2017/031411
§ 371 (c)(1),
(2) Date: Feb. 28, 2019

(87) PCT Pub. No.: WO2018/043656
PCT Pub. Date: Mar. 8, 2018

(65) Prior Publication Data
US 2019/0249846 A1    Aug. 15, 2019

(30) Foreign Application Priority Data

Sep. 2, 2016  (JP) .............................. JP2016-171891

(51) Int. Cl.
*H05B 45/10* (2020.01)
*H05B 45/00* (2022.01)
(Continued)

(52) U.S. Cl.
CPC ............ *C03C 25/106* (2013.01); *C03C 25/12* (2013.01); *F21V 7/09* (2013.01)

(58) Field of Classification Search
CPC ...... H05B 3/0033–0042; H05B 3/0061; H05B 45/00–12; F21V 7/00–0033; F21V 7/06–09; C03C 25/104–1063
See application file for complete search history.

(56) References Cited

U.S. PATENT DOCUMENTS 6,244,732 B1 *  6/2001  Futami ...................... F21V 5/04
                                                     362/328
7,399,982 B2     7/2008  Siegel
(Continued)

FOREIGN PATENT DOCUMENTS

JP     2016-004927 A     1/2016

OTHER PUBLICATIONS

An Office Action; "Notification of Reasons for Refusal," mailed by the Japanese Patent Office dated Jan. 8, 2020, which corresponds to Japanese Patent Application No. 2016-171891 and is related to U.S. Appl. No. 16/329,359; with English language translation.
(Continued)

*Primary Examiner* — Michael A LaFlame, Jr.
(74) *Attorney, Agent, or Firm* — Studebaker & Brackett PC

(57) ABSTRACT

A light irradiation device includes a first reflective portion that is arranged at a concave inner surface formed so as to have a substantially arcuate shape and that permits wire-like member to be inserted into an interior thereof, at least one light-emitting portion that emits light in such fashion as to be directed toward the wire-like member from a direction which is circumferential with respect to the wire-like member, and a second reflective portion that is formed in planar fashion, at least a portion of the second reflective portion is arranged between an end of the first reflective portion and an end of the light-emitting portion in a direction circumferential with respect to the first reflective portion.

15 Claims, 11 Drawing Sheets

(51) Int. Cl.
  *F21V 7/04* (2006.01)
  *C03C 25/104* (2018.01)
  *C03C 25/106* (2018.01)
  *C03C 25/12* (2006.01)
  *F21V 7/09* (2006.01)

(56) References Cited

U.S. PATENT DOCUMENTS

| | | | |
|---|---|---|---|
| 7,967,478 B2* | 6/2011 | Incerti | F21K 9/232 |
| | | | 362/326 |
| 2004/0165388 A1* | 8/2004 | Shoji | F21V 5/045 |
| | | | 362/304 |
| 2007/0263388 A1* | 11/2007 | Lai | F21V 14/02 |
| | | | 362/287 |
| 2008/0192477 A1* | 8/2008 | Holder | F21V 7/0008 |
| | | | 362/297 |
| 2008/0247170 A1* | 10/2008 | Peck | F21V 7/0008 |
| | | | 362/297 |
| 2009/0097258 A1* | 4/2009 | Tseng | F21V 14/04 |
| | | | 362/296.05 |
| 2010/0085761 A1* | 4/2010 | Derome | F21V 7/0075 |
| | | | 359/853 |
| 2012/0039587 A1* | 2/2012 | Endo | H05B 3/0038 |
| | | | 392/422 |
| 2015/0028020 A1 | 1/2015 | Childers | |
| 2017/0016596 A1* | 1/2017 | Kim | F21V 14/04 |

OTHER PUBLICATIONS

International Preliminary Report on Patentability and Written Opinion issued in PCT/JP2017/031411; dated Mar. 14, 2019.

International Search Report issued in PCT/JP2017/031411; dated Nov. 21, 2017.

* cited by examiner

LIGHT IRRADIATION DEVICE

TECHNICAL FIELD

The present invention relates to a light irradiation device which causes light to be irradiated in such fashion as to be directed toward wire-like member.

BACKGROUND ART

Conventionally known as a light irradiation device is a light irradiation device comprising a reflective portion in the shape of a curved surface, and a light-emitting portion that emits light (e.g., Patent Literature No. 1). In addition, wire-like member is inserted within the interior of the reflective portion, and the light-emitting portion emits light in such fashion as to be directed toward the wire-like member from a direction that is circumferential with respect to the wire-like member.

It so happens that the luminous efficiency of the light irradiation device associated with Patent Reference No. 1 is low. For example, because light propagating between an end of the reflective portion and an end of the light-emitting portion does not irradiate the wire-like member, this is one of the major reasons for the low luminous efficiency. Note that luminous efficiency (efficiency with which light is utilized) refers to the fractional percentage of light emitted by light-emitting portion(s) that actually irradiates wire-like member.

CITATION LIST

Patent Literature

Patent Literature 1: Specification of U.S. Pat. No. 7,399,982

SUMMARY OF THE INVENTION

Technical Problem

The problem is therefore to provide a light irradiation device that makes it possible to improve luminous efficiency.

Solution To Problem

There is provided a light irradiation device, which includes:
- a first reflective portion that is arranged at a concave inner surface formed so as to have a substantially arcuate shape and that permits wire-like member to be inserted into an interior thereof;
- at least one light-emitting portion that emits light in such fashion as to be directed toward the wire-like member from a direction which is circumferential with respect to the wire-like member; and
- a second reflective portion that is formed in planar fashion;
- wherein at least a portion of the second reflective portion is arranged between an end of the first reflective portion and an end of the light-emitting portion in a direction circumferential with respect to the first reflective portion.

Further, the light irradiation device may include a configuration in which:
- wherein the second reflective portion is arranged in such fashion that an angle of intersection thereof with a radial direction of the first reflective portion is greater than 0° but less than 90°.

Further, the light irradiation device may include:
- an insertion portion which is such that an insertion passage is formed at an interior thereof, the insertion passage permitting insertion of the wire-like member into the interior of the first reflective portion;
- wherein the first reflective portion is arranged so as to cause a center of curvature thereof to be offset in eccentric fashion from a center of the insertion passage.

Advantageous Effect of the Invention

As described above, excellent benefits are provided in that a light irradiation device is made capable of improving luminous efficiency.

DESCRIPTION OF EMBODIMENTS

Below, an embodiment of a light irradiation device is described with reference to FIG. 1 through FIG. 9. At the respective drawings (and the same is true for FIG. 10 through FIG. 17), note that dimensional ratios at the drawings and actual dimensional ratios are not necessarily consistent, and note further that dimensional ratios are not necessarily consistent from drawing to drawing.

Figure 1:
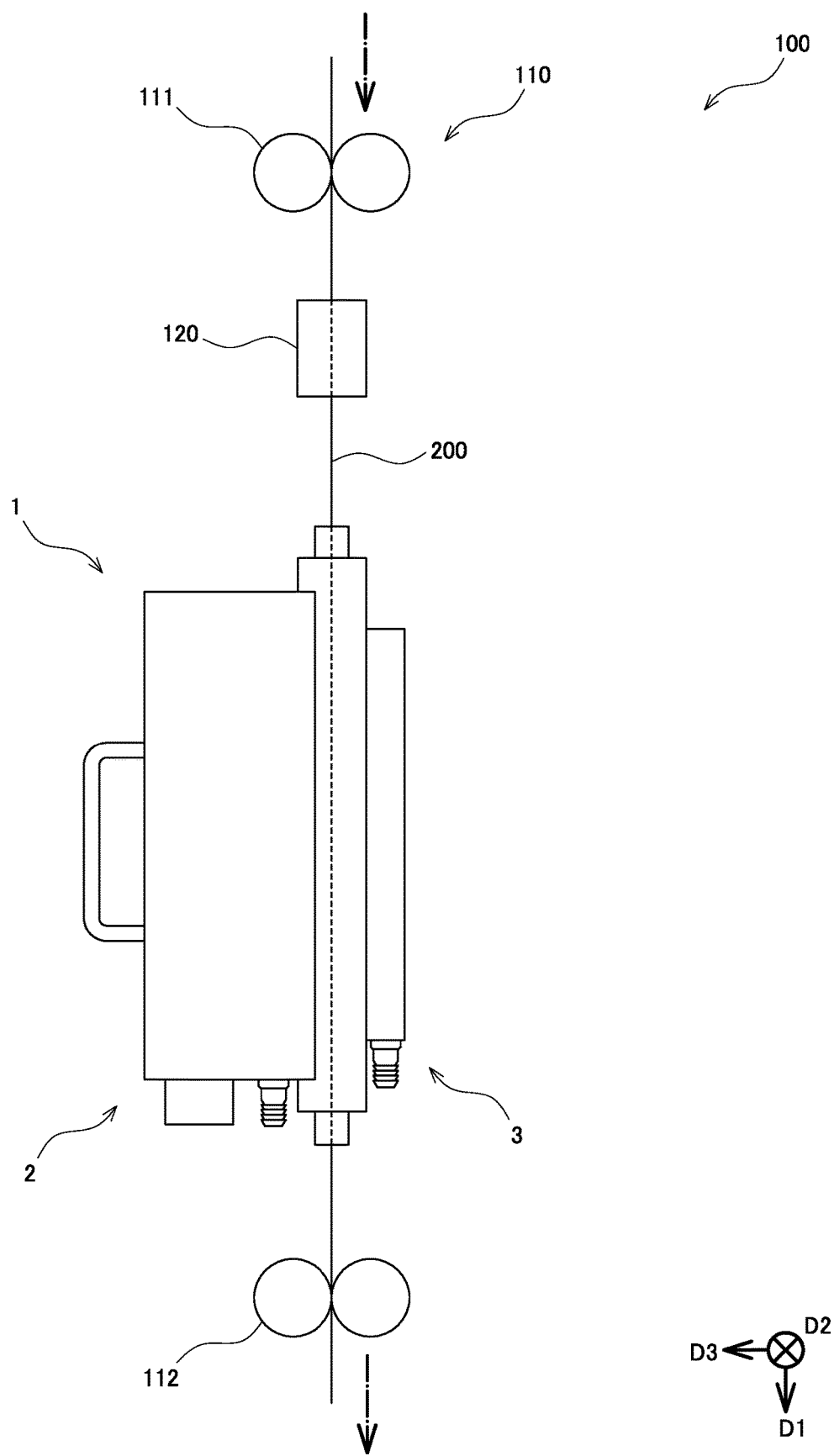
FIG. 1 is drawing which is a full view of a light irradiation device associated with an embodiment and which is a drawing showing a situation such as might exist when wire-like member is inserted therein.

As shown in FIG. 1, light irradiation device 1 associated with the present embodiment is employed at optical fiber manufacturing apparatus 100 which manufactures optical fiber 200 constituting wire-like member 200. But before describing various aspects of the constitution of light irradiation device 1, description will first be given with respect to optical fiber manufacturing apparatus 100.

Optical fiber manufacturing apparatus 100 comprises conveyor apparatus 110 that causes optical fiber 200 to be conveyed along conveying direction (downward in FIG. 1) D1, and coating apparatus 120 that causes an optical fiber 200 which is conveyed thereto to be coated with ultraviolet-curable resin. In addition, conveyor apparatus 110 is such that conveying members 111, 112, which cause optical fiber 200 to be conveyed while being held thereby in such fashion as to permit insertion of optical fiber 200 into a prescribed location at the interior of light irradiation device 1, are respectively provided at locations upstream and downstream from light irradiation device 1.

In addition, by causing optical fiber 200, which might travel through the interior thereof at a speed of, e.g., 1000 meters per minute, to be irradiated with ultraviolet light, light irradiation device 1 cures the resin with which optical fiber 200 is coated. As a result, optical fiber 200 which is manufactured by optical fiber manufacturing apparatus 100 might, for example, be made up of bare optical fiber which consists of glass fiber, and a film coating at which the ultraviolet-curable resin has been cured.

Figure 2:
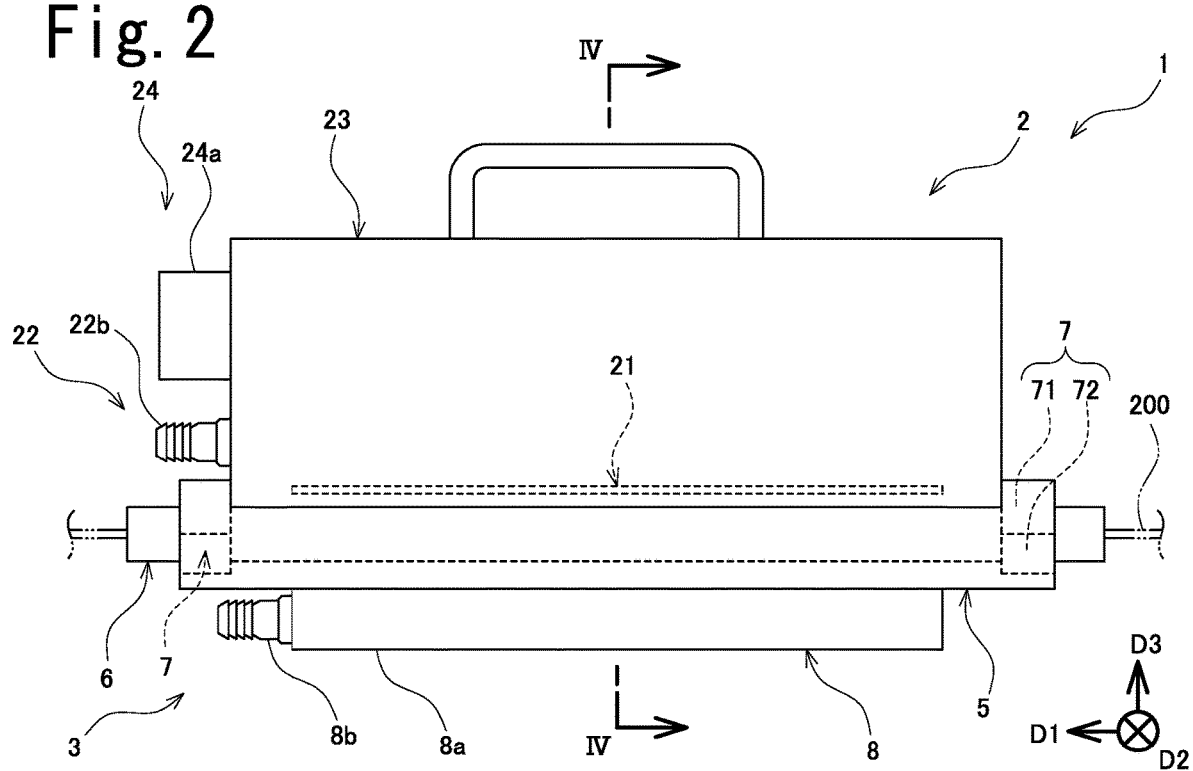
FIG. 2 is a drawing which is a full front view of a light irradiation device associated with same embodiment.
Figure 3:
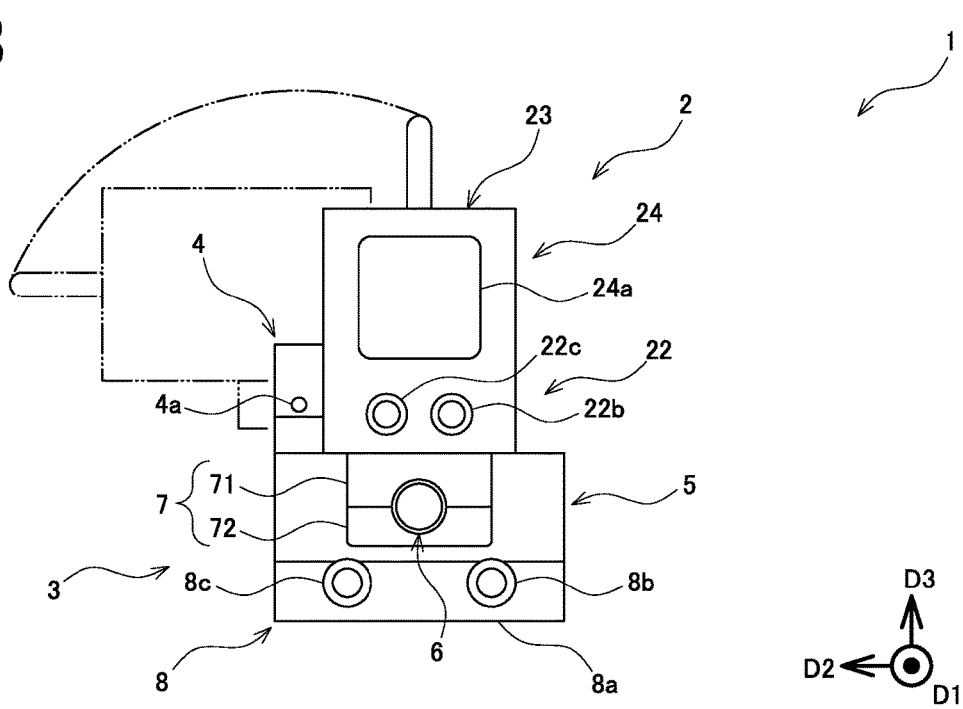
FIG. 3 is a drawing which is a full side view of a light irradiation device associated with same embodiment.
Figure 4:
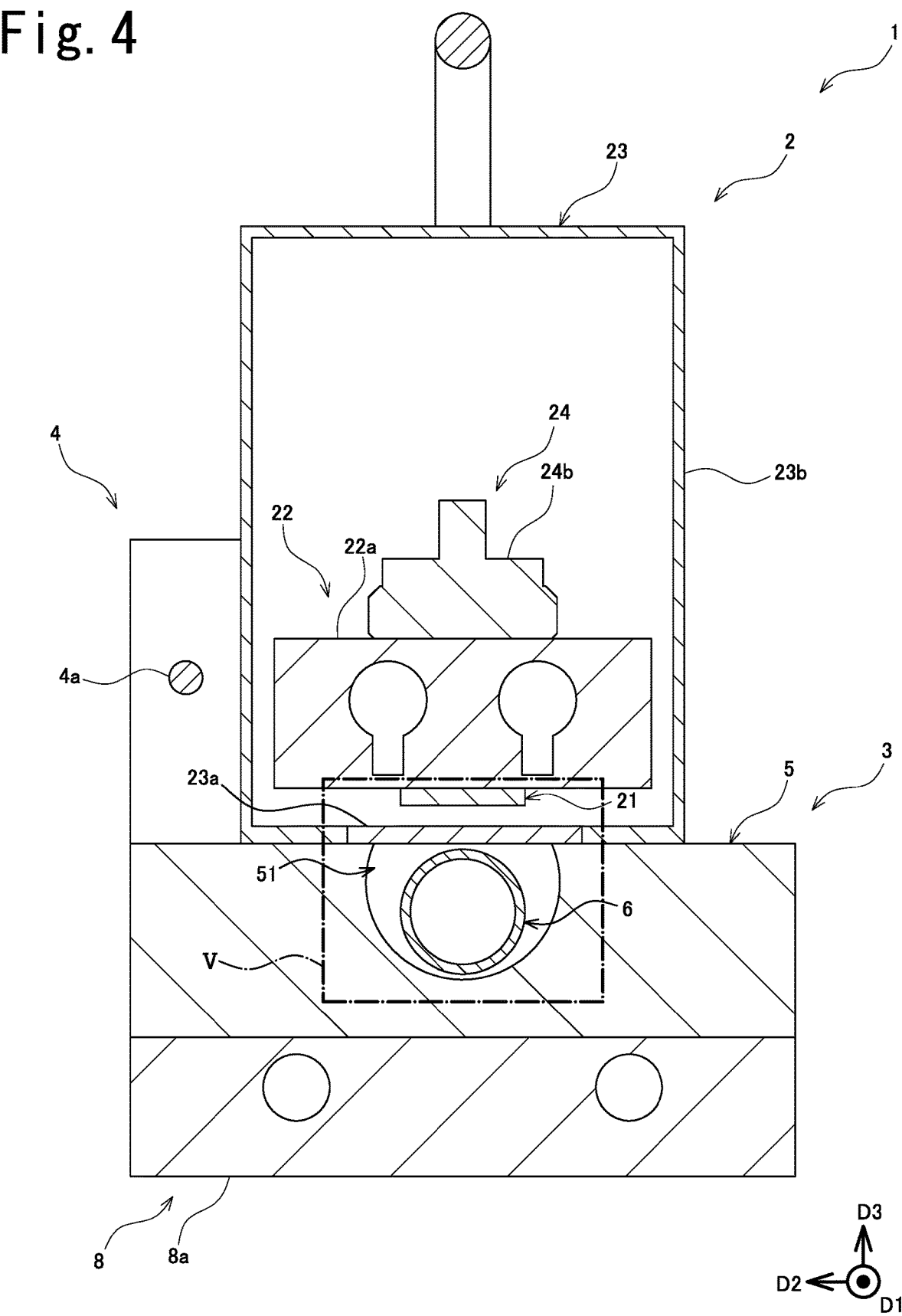
FIG. 4 is a drawing which is an enlarged view of a section taken along IV-IV in FIG. 2.

As shown in FIG. 2 through FIG. 4, light irradiation device 1 associated with the present embodiment comprises light source unit 2 which causes light to be irradiated in such fashion as to be directed toward optical fiber (wire-like member) 200, and insertion unit 3 which causes insertion of optical fiber 200. Furthermore, light irradiation device 1 comprises connecting portion 4 which causes light source unit 2 and insertion unit 3 to be rotatably connected by rotating shaft 4a.

Light source unit 2 comprises light source 21 which causes light to be irradiated in such fashion as to be directed toward optical fiber 200, light source cooling unit 22 which cools light source 21, and case 23 which houses light source 21 and so forth. Furthermore, light source unit comprises electric power supply unit 24 for supplying electric power to light source 21.

Light source 21 is formed so as to be elongated in the direction (conveying direction) D1 in which optical fiber 200 extends. In addition, light source 21 is arranged so as to face optical fiber 200. In accordance with the present embodiment, light source 21 emits ultraviolet light (e.g., light of wavelength 300 nm to 400 nm) so as to cause curing of ultraviolet-curable resin.

Light source cooling unit 22 comprises cooling main body 22a which is contiguous with light source 21 and through the interior of which cooling liquid flows, inlet portion 22b for permitting entry of cooling liquid into cooling main body 22a, and outlet portion 22c for permitting exit of cooling liquid from cooling main body 22a. Note that cooling main body 22a is arranged at the interior of case 23, and that inlet portion 22b and outlet portion 22c are arranged at the exterior of case 23.

Case 23 comprises light transmitting portion 23a which allows light radiating from light source 21 to pass therethrough, and light blocking portion 23b which blocks light. Light transmitting portion 23a is formed so as to be elongated in the direction (conveying direction) D1 in which optical fiber 200 extends. In addition, light transmitting portion 23a is arranged so as to face light source 21. This being the case, light transmitting portion 23a is arranged between light source 21 and optical fiber 200.

Electric power supply unit 24 might, for example, comprise electric power connection unit 24a at which cable(s) and/or the like are connected so as to permit supply of electric power thereto from the exterior, and terminal block 24b having various terminals for electrically connecting electric power connection unit 24a and light source 21. Note that electric power connection unit 24a is arranged at the exterior of case 23, and that terminal block 24b is arranged at the interior of case 23.

Insertion unit 3 comprises main body portion 5, at the interior of which optical fiber 200 is inserted; insertion portion 6, formed at the interior of which is insertion passage 61 for permitting insertion of optical fiber 200 into the interior of main body portion 5; and securing portion 7, by means of which insertion portion 6 is secured to main body portion 5. Furthermore, insertion unit 3 comprises main body cooling portion 8 which cools main body portion 5.

Securing portion 7 comprises a pair of gripping portions 71, 72 between which insertion portion 6 is held. In addition, by causing the ends in the long direction of insertion portion 6 to be held between the pair of gripping portions 71, 72, securing portion 7 causes the ends in the long direction of main body portion 5 and the ends in the long direction of insertion portion 6 to be secured.

Main body cooling portion 8 comprises cooling main body 8a which is contiguous with main body portion 5 and through the interior of which cooling liquid flows, inlet portion 8b for permitting entry of cooling liquid into cooling main body 8a, and outlet portion 8c for permitting exit of cooling liquid from cooling main body 8a. In addition, main body cooling portion 8 (cooling main body 8a) is constituted in such fashion as to be removably installed on main body portion 5.

Figure 5:
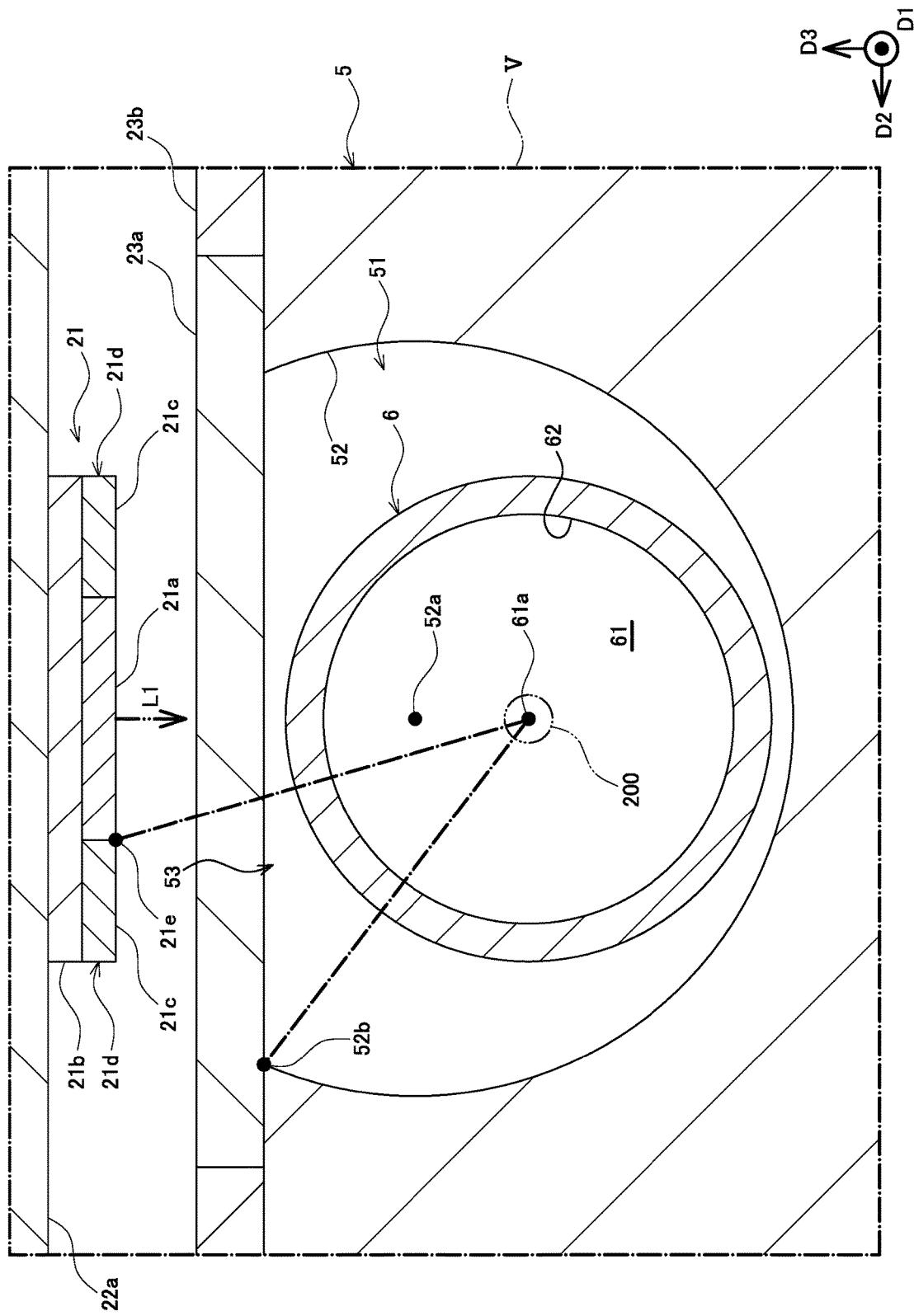
FIG. 5 is a drawing which is an enlarged view of region V in FIG. 4.

As shown in FIG. 4 and FIG. 5, main body portion 5 is formed so as to be elongated in the direction (conveying direction) D1 in which optical fiber 200 extends. Furthermore, main body portion 5 comprises concavity 51, within which optical fiber 200 can be inserted in parallel fashion with respect to the long direction thereof. In addition, concavity 51 comprises first reflective portion 52, which reflects light, at an inner surface thereof that is formed so as to be substantially arcuate in shape. Furthermore, concavity 51 is provided with a single opening 53 to one side in the circumferential direction of first reflective portion 52.

First reflective portion 52 is formed so as to be elongated in the direction (conveying direction) D1 in which optical fiber 200 extends. In addition, first reflective portion 52 is in the form of a curved surface. More specifically, as viewed in a section perpendicular to the long direction thereof, first reflective portion 52 is formed so as to be substantially arcuate such that the shape thereof is a portion of a true circle. In addition, first reflective portion 52 is formed so as to be of such size as to permit insertion therewithin of insertion portion 6.

Opening 53 is formed so as to be elongated in the direction (conveying direction) D1 in which optical fiber 200 extends. In addition, opening 53 is arranged so as to face light source 21 and so as to be covered by light transmitting portion 23a. As a result, light from light source 21 passes through light transmitting portion 23a and opening 53 to irradiate optical fiber 200 at the interior of first reflective portion 52. Accordingly, light source 21 causes light to be irradiated in such fashion as to be directed at optical fiber 200 from one side in the circumferential direction of optical fiber 200.

Insertion portion 6 comprises insertion hole 62 which forms insertion passage 61 at the interior thereof, insertion hole 62 being arranged at the interior and exterior of first reflective portion 52. More specifically, as a result of the fact that insertion portion 6 is formed after the fashion of a translucent cylindrical body, being formed so as to be elongated in the direction (conveying direction) D1 in which optical fiber 200 extends, insertion hole 62 is arranged so as to encompass the interior and the exterior of first reflective portion 52. In addition, as viewed in a section perpendicular to the long direction thereof, insertion hole 62 is formed so as to be circular. That is, insertion hole 62 is such that circular insertion passage 61 is formed at the interior thereof.

In accordance with the present embodiment, a quartz tube is employed as insertion portion 6, the interior of insertion portion 6 being filled with nitrogen gas. This makes it possible to suppress the tendency for oxygen to impede the polymerization reaction at the time that the ultraviolet-curable resin is cured, and has the benefit of promoting the resin curing reaction. Furthermore, because volatile substances are produced at the time that resin on the surface of optical fiber 200 is cured, insertion portion 6 prevents said volatile substances from adhering to light source unit 2 (light transmitting portion 23a) and first reflective portion 52.

As shown in FIG. 5, first reflective portion 52 is arranged such that the center 52a of curvature of the substantially arcuate shape is offset in eccentric fashion from the center 61a of insertion passage 61. Stating this another way, insertion portion 6 (insertion hole 62) is arranged such that the center 61a of insertion passage 61 is offset in eccentric fashion from the center 52a of curvature of the substantially arcuate shape of first reflective portion 52.

In addition, first reflective portion 52 is arranged such that center 52a of curvature is offset in eccentric fashion, in the direction L1 of the optical axis of light emitted from light source 21 (in the direction toward or away from light source 21), from the center 61a of insertion passage 61. Stating this another way, insertion portion 6 (insertion hole 62) is arranged such that the center 61a of insertion passage 61 is offset in eccentric fashion, in the direction L1 of the optical axis, from the center 52a of curvature of the substantially arcuate shape of first reflective portion 52.

Moreover, first reflective portion 52 is arranged such that center 52a of curvature is offset in eccentric fashion in a direction that causes it to be closer to light source 21 than it is to the center 61a of insertion passage 61. Stating this another way, insertion portion 6 (insertion hole 62) is arranged such that the center 61a of insertion passage 61 is offset in eccentric fashion, in a direction that causes it to be farther away from light source 21, from the center 52a of curvature of first reflective portion 52.

In accordance with the present embodiment, the arrangement of light source 21 and first reflective portion 52 is line symmetric about an axis of symmetry that extends in the direction L1 of the optical axis. Note that center 52a of curvature of the substantially arcuate shape of first reflective portion 52 is the center of the circle inscribed by first reflective portion 52. Furthermore, the center 61a of insertion passage 61 is the center of the circle inscribed by the surface(s) (the inner surface of insertion hole 62 at the present embodiment) that constitute insertion passage 61.

Light source 21 comprises light-emitting portion 21a which emits light in such fashion as to be directed at optical fiber 200 from the circumferential direction of optical fiber 200, substrate 21b which supports light-emitting portion 21a, and reflector 21d having second reflective portion 21c which is formed in planar fashion. In addition, light-emitting portion 21a, substrate 21b, and reflector 21d (second reflective portion 21c) are respectively formed so as to be elongated in the direction (conveying direction) D1 in which optical fiber 200 extends.

In accordance with the present embodiment, solid-state light source element(s) (e.g., LED(s)) are employed as light-emitting portion 21a. It should be noted, of course, that light-emitting portion 21a is not limited to such constitution, it being sufficient that this be member(s) capable of emitting light in such fashion as to be directed at optical fiber 200. Furthermore, light-emitting portion 21a is secured to the surface to one side of substrate 21b, and the surface to the other side of substrate 21b is secured to light source cooling unit 22 (more specifically, cooling main body 22a).

Reflector 21d is secured to the surface to one side of substrate 21b. Note that reflector 21 may be formed by causing the surface to one side of substrate 21b to be coated with coating material comprising a reflective substance, or a mirror may be secured by means of adhesive, bolt(s), or the like to the surface to one side of substrate 21b. In addition, a pair of reflectors 21d are provided in such fashion as to straddle light-emitting portion 21a. As a result, it will be the case that a pair of second reflective portions 21c will be provided in such fashion as to straddle light-emitting portion 21a.

Second reflective portion 21c is arranged in such fashion as to face center 52a of curvature of first reflective portion 52. More specifically, second reflective portion 21c is arranged so as to be perpendicular to the direction L1 of the optical axis of the light which is emitted from light source 21. In addition, the entirety of second reflective portion 21c is arranged between end 52b of first reflective portion 52 and end 21e of light-emitting portion 21a in a direction circumferential with respect to first reflective portion 52.

Furthermore, second reflective portion 21c is arranged so as to be toward light source 21 from the center 52a of curvature of first reflective portion 52 along the direction L1 of the optical axis of the light which is emitted from light source 21. In addition, second reflective portion 21c causes a portion of the light which is incident thereon without irradiating optical fiber 200 to be reflected therefrom in such fashion as to be directed at optical fiber 200.

Moreover, second reflective portion 21c is constituted such that, when light from light-emitting portion 21a is incident thereon, not less than 50% of said light is reflected therefrom, it being preferred that this be not less than 60% thereof, more preferred that this be not less than 70% thereof, and still more preferred that this be not less than 80% thereof. Furthermore, second reflective portion 21c may be constituted so as to cause light which is incident thereon to be reflected in specular fashion, or it may be constituted so as to cause it to be reflected in diffuse fashion.

Constitution of light irradiation device 1 associated with the present embodiment is as described above; an example of the operation and effect that may be produced as a result of causing the center of wire-like member 200 to be offset in eccentric fashion from the center 52a of curvature of the substantially arcuate shape of first reflective portion 52 is described below with reference to FIG. 6 and FIG. 7. Note that the center of wire-like member 200 is taken to be the location of center 61a of insertion passage 61.

Figure 6:
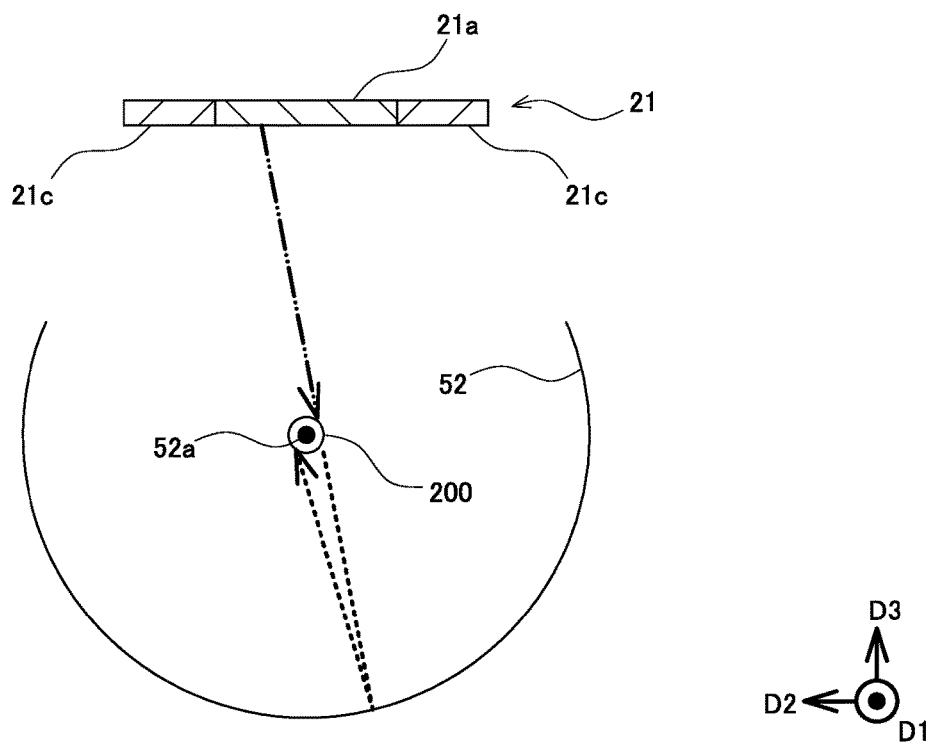
FIG. 6 is a drawing which is a sectional view of the principal components of a light irradiation device associated with a working example and which is a drawing for explaining a situation such as might exist when irradiating wire-like member with light.
Figure 7:
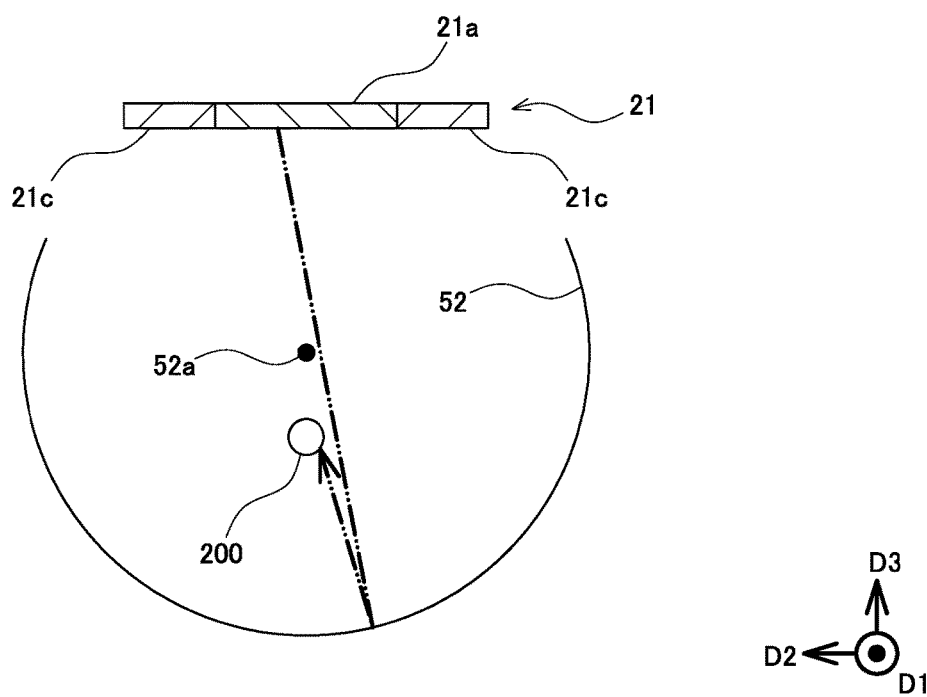
FIG. 7 is a drawing which is a sectional view of the principal components of a light irradiation device associated with the working example in FIG. 5 and which is a drawing for explaining a situation such as might exist when irradiating wire-like member with light.

First, at the working example associated with FIG. 6 and the working example associated with FIG. 7, whereas the locations of light-emitting portion 21a and first reflective portion 52 are different, the locations of light-emitting portion 21a and wire-like member 200 are the same. Accordingly, the amount of light that is emitted from light-emitting portion 21a and directly irradiates wire-like member 200 without being reflected by first reflective portion 52 is the same.

It so happens at the working example associated with FIG. 6 that the center of wire-like member 200 coincides with the center 52a of curvature of the substantially arcuate shape of first reflective portion 52. In accordance with such constitution, for light to irradiate the back face (the side opposite the side that faces light source 21; the side toward the bottom in FIG. 6 and FIG. 7) of wire-like member 200, it is necessary that it be reflected by first reflective portion 52 after it has passed through the vicinity of the center 52a of curvature of the substantially arcuate shape of first reflective portion 52 (see broken line in FIG. 6).

However, light that might otherwise have passed through the vicinity of the center 52a of curvature of the substantially arcuate shape of first reflective portion 52 directly irradiates the front face (the side that faces light source 21; the side toward the top in FIG. 6 and FIG. 7) of wire-like member 200 (see double-dash chain line in FIG. 6). Accordingly, in the working example associated with FIG. 6, light that is emitted from light-emitting portion 21a and is reflected by first reflective portion 52 does not really irradiate wire-like member 200 very much.

On the other hand, at the working example associated with FIG. 7, the center of wire-like member 200 is offset in eccentric fashion from the center 52a of curvature of the substantially arcuate shape of first reflective portion 52. In accordance with such constitution, for light to irradiate the back face of wire-like member 200, it is not necessary that it pass through the location of wire-like member 200. Accordingly, a portion of the light that is emitted from light-emitting portion 21a and is reflected by first reflective portion 52 irradiates the back face of wire-like member 200. As a result, the back face of wire-like member 200 is also irradiated by light in the same fashion as is the front face of wire-like member 200.

Accordingly, at the working example associated with FIG. 6 and the working example associated with FIG. 7, whereas the amount of light that is emitted from light-emitting portion 21a and directly irradiates wire-like member 200 is the same, the amount of light that irradiates wire-like member 200 after being emitted from light-emitting portion 21a and reflected by first reflective portion 52 is different. It is thus preferred that a constitution be adopted in which the center of wire-like member 200 is offset in eccentric fashion from the center 52a of curvature of the substantially arcuate shape of first reflective portion 52. That is, it is preferred that a constitution be adopted in which the center 61a of insertion passage 61 is offset in eccentric fashion from the center 52a of curvature of the substantially arcuate shape of first reflective portion 52.

The operation and effect that may be produced as a result of arrangement of second reflective portion 21c will next be described.

First reflective portion 52 is formed so as to have a substantially arcuate shape. This being the case, the optical path of the light that is emitted from light source 21 (light-emitting portion 21a), being repeatedly reflected by first reflective portion 52, tends to go back toward light source 21. Furthermore, as the diameter of wire-like member 200, which is the object being irradiated, is comparatively small, because most of the light that is emitted from light source 21 is either repeatedly reflected by first reflective portion 52 or is absorbed by light source 21, luminous efficiency is not good.

But because second reflective portion 21c is provided between end 52b of first reflective portion 52 and end 21e of light-emitting portion 21a, it is possible to cause the optical path of light that is headed back toward light source 21 to be directed toward wire-like member 200. This makes it possible to increase luminous efficiency.

An example of such operation and effect will now be described with reference to FIG. 8 and FIG. 9.

Figure 8:
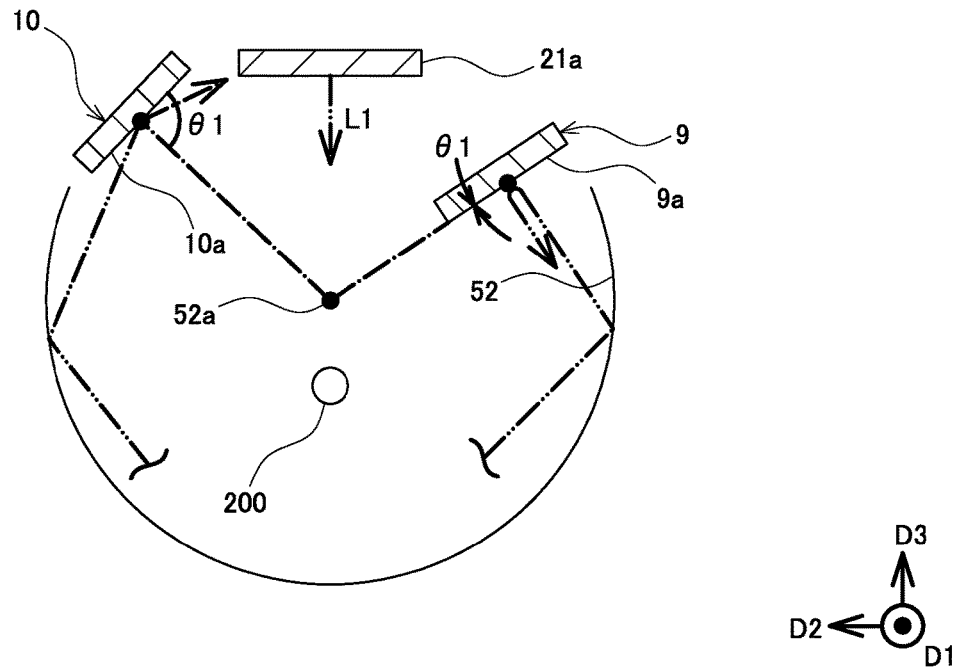
FIG. 8 is a drawing which is a sectional view of the principal components of a light irradiation device associated with another working example and which is a drawing for explaining a situation such as might exist when irradiating wire-like member with light.
Figure 9:
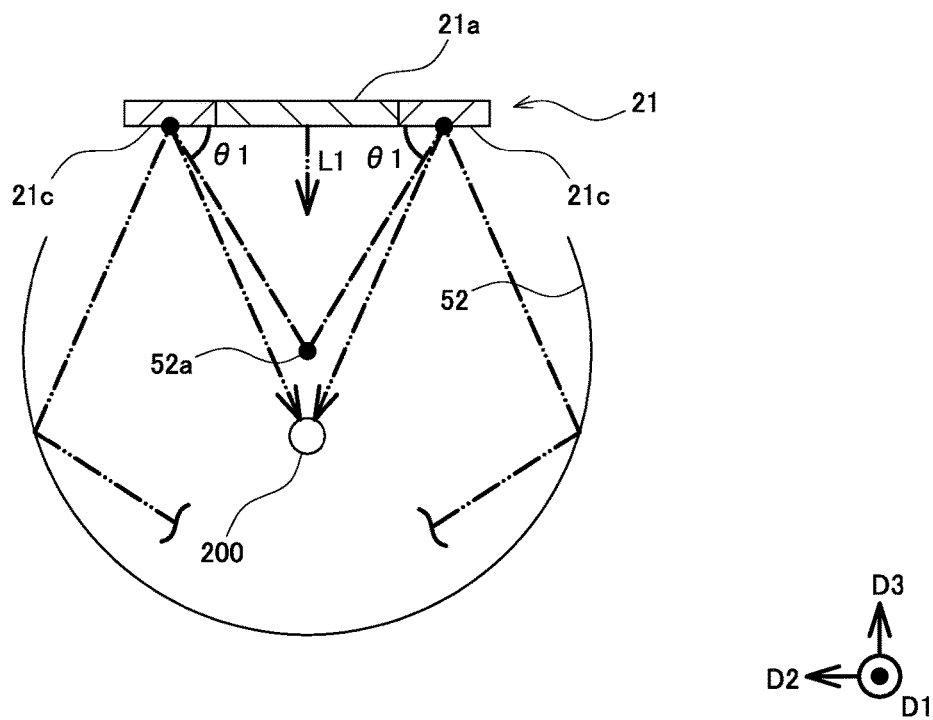
FIG. 9 is a drawing which is a sectional view of the principal components of a light irradiation device associated with the working example in FIG. 5 and which is a drawing for explaining a situation such as might exist when irradiating wire-like member with light.

At the working example associated with FIG. 8, the angle θ1 of intersection between the radial direction of first reflective portion 52 (more specifically, the radial direction of first reflective portion 52 which is directed toward second reflective portion 9a from center 52a of curvature of first reflective portion 52) and second reflective portion 9a of one reflector 9 is 0°, and the angle θ1 of intersection between the radial direction of first reflective portion 52 and second reflective portion 10a of the other reflector 10 is 90°. Furthermore, at the working example associated with FIG. 9, the angle θ1 of intersection between the radial direction of first reflective portion 52 and second reflective portion 21c is greater than 0° but less than 90° (being shown as approximately 60° at FIG. 9).

Note that the radial directions of first reflective portion 52 which serve as datums for intersection angles θ1 are the radial directions of first reflective portion 52 which pass through the centers of second reflective portions 9a, 10a, 21c. Furthermore, where, as is the case with second reflective portion 9a of the one reflector 9, the arrangement is such that it faces toward first reflective portion 52 and is parallel to the radial direction of first reflective portion 52, the intersection angle θ1 will be 0°. In addition, the direction of increasing intersection angle θ1 is the direction of rotation that causes second reflective portion 52, 9a, 10a, 21c to go from a position in which the intersection angle θ1 is 0° to one in which it faces the center 52a of curvature of first reflective portion 52.

For example, the clockwise direction is the direction of increasing intersection angle θ1 at second reflective portion 9a of the one reflector 9, and the counterclockwise direction is the direction of increasing intersection angle θ1 at second reflective portion 10a of the other reflector 10. Note that said intersection angle θ1 exists over the range 0° to 360° (=0°).

At the working example associated with FIG. 8, for example, if light proceeding peripherally about wire-like member 200 is reflected by one of the second reflective portions (e.g. the one at the right side in FIG. 8) 9a, most of said light will be made to proceed in such fashion as to be directed toward first reflective portion 52. Thus, when the intersection angle θ1 at second reflective portion 9a is approximately 270° to 360° (0°), if light proceeding peripherally about wire-like member 200 is reflected by second reflective portion 9a, most of said light will be made to proceed in such fashion as to be directed toward first reflective portion 52.

Furthermore, for example, if light proceeding peripherally about wire-like member 200 is reflected by the other second reflective portion (e.g. the one at the left side in FIG. 8) 9a, most of said light will be made to proceed in such fashion as to be directed away from the center 52a of curvature of first reflective portion 52. Thus, when the intersection angle θ1 at second reflective portion 9a is 90° to approximately 180°, if light proceeding peripherally about wire-like member 200 is reflected by second reflective portion 9a, most of said light will be made to proceed in such fashion as to be directed away from the center 52a of curvature of first reflective portion 52. Moreover, when the intersection angle θ1 at second reflective portion 9a is approximately 180° to approximately 270°, light proceeding peripherally about wire-like member 200 tends not to be incident on second reflective portion 9a.

On the other hand, at the working example associated with FIG. 9, if light proceeding peripherally about wire-like member 200 is reflected by second reflective portion 21c, most of said light will be made to proceed in such fashion as to be directed toward the center 52a of curvature of first reflective portion 52. Thus, when the intersection angle θ1 at second reflective portion 21c is greater than 0° but less than 90°, if light proceeding peripherally about wire-like member 200 is reflected by second reflective portion 21c, most of said light will be made to proceed in such fashion as to be directed toward the center 52a of curvature of first reflective portion 52; i.e., toward wire-like member 200.

Accordingly, when the intersection angle θ1 at second reflective portion 21c is greater than 0° but less than 90°, after light proceeding peripherally about wire-like member 200 is reflected by second reflective portion 21c, a portion of said light will irradiate wire-like member 200. Thus, by causing the intersection angle θ1 at second reflective portion 21c to be greater than 0° but less than 90°, it is possible to efficiently improve luminous efficiency.

A constitution in which the intersection angle θ1 at second reflective portion 21c is greater than 0° but less than 90° is therefore preferred. It should be noted, of course, that the intersection angle θ1 at second reflective portion 21c is not limited to such constitution. Furthermore, a constitution in which the angle of intersection of second reflective portion 21 with a direction perpendicular to the direction L1 of the optical axis of the light which is emitted from light source 21 is not greater than 30° is preferred. At the working example associated with FIG. 9, note that said angle is 0°.

Furthermore, another operation and another effect that may be produced as a result of arrangement of second reflective portion 21c will now be described.

Wire-like member 200 is irradiated by light directly irradiated from light-emitting portion 21a, by light reflected from first reflective portion 52, and by light reflected from second reflective portion 21c. That is, as a result of combination of light-emitting portion 21a and second reflective portion 21c, light source 21 is able to substantially increase the area from which light is emitted. As a result, because it is possible to cause light to be emitted over a comparatively wide domain, it will be possible, even where vibration of wire-like member 200 causes the position of wire-like member 200 to shift, to suppress variation in the amount of light that irradiates wire-like member 200, as a result of which it will be possible to maintain high luminous efficiency.

Accordingly, even where the width dimension of light-emitting portion 21a is made small, arrangement of second reflective portion 21c makes it possible, even where vibration of wire-like member 200 causes position to shift, to maintain high luminous efficiency. Moreover, by causing wire-like member 200 to be arranged in a position such that it faces in the direction L1 of the optical axis of the light which is emitted from light source 21 from the center of light-emitting portion 21a, the amount of light that is directly irradiated thereon from light-emitting portion 21a is maximized. Accordingly, adoption of such constitution makes it possible to effectively improve luminous efficiency.

As described above, the light irradiation device 1 of the embodiment includes: a first reflective portion 52 that is arranged at a concave inner surface formed so as to have a substantially arcuate shape and that permits wire-like member 200 to be inserted into an interior thereof; at least one light-emitting portion 21a that emits light in such fashion as to be directed toward the wire-like member 200 from a direction which is circumferential with respect to the wire-like member 200; and a second reflective portion 21c that is formed in planar fashion; wherein at least a portion of the second reflective portion 21c is arranged between an end 52b of the first reflective portion 52 and an end 21e of the light-emitting portion 21a in a direction circumferential with respect to the first reflective portion 52.

In accordance with such constitution, first reflective portion 52 is arranged at a concave inner surface that is formed so as to have a substantially arcuate shape. In addition, wire-like member 200 is inserted into the interior of first reflective portion 52, at least one (one in the present embodiment) light-emitting portion 21a emitting light in such fashion as to be directed toward wire-like member 200 from the circumferential direction of wire-like member 200.

Furthermore, second reflective portion 21c is formed in planar fashion. In addition, at least a portion (the entirety in the present embodiment) of second reflective portion 21c is arranged between end 52b of first reflective portion 52 and end 21e of light-emitting portion 21a in a direction circumferential with respect to first reflective portion 52.

As a result, because light propagating between end 52b of first reflective portion 52 and end 21e of light-emitting portion 21a is reflected by second reflective portion 21c, a portion of the light reflected from second reflective portion 21c is made to proceed in such fashion as to be directed toward wire-like member 200 and is made to irradiate wire-like member 200. Accordingly, it is possible to improve luminous efficiency.

Further, in the light irradiation device 1 of the embodiment, wherein the second reflective portion 21c is arranged in such fashion that an angle θ1 of intersection thereof with a radial direction of the first reflective portion 52 is greater than 0° but less than 90°.

In accordance with such constitution, the intersection angle θ1 between the radial direction of first reflective portion 52 and second reflective portion 21c is greater than 0° but less than 90°. As a result, due, for example, to the fact that light repeatedly reflected by first reflective portion 52 and proceeding peripherally about wire-like member 200 is reflected by second reflective portion 21c, a portion of said light is made to proceed in such fashion as to be directed toward wire-like member 200 and is made to irradiate wire-like member 200. Accordingly, it is possible to further improve luminous efficiency.

Further, the light irradiation device 1 of the embodiment includes: an insertion portion 6 which is such that an insertion passage 61 is formed at an interior thereof, the insertion passage 61 permitting insertion of the wire-like member 200 into the interior of the first reflective portion 52; wherein the first reflective portion 52 is arranged so as to cause a center 52a of curvature thereof to be offset in eccentric fashion from a center 61a of the insertion passage 61.

In accordance with such constitution, insertion portion 6 is such that formed at the interior thereof is insertion passage 61 for permitting insertion of wire-like member 200 into the interior of first reflective portion 52. In addition, because the center 52a of curvature of first reflective portion 52 is offset in eccentric fashion from the center 61a of insertion passage 61, wire-like member 200 is located in a position that is offset from the center 52a of curvature of first reflective portion 52. As a result, a portion of the light that is produced by light-emitting portion 21a and is reflected by first reflective portion 52 is made to proceed in such fashion as to be directed toward wire-like member 200 and is made to irradiate wire-like member 200. Accordingly, it is possible to efficiently improve luminous efficiency.

The light irradiation device is not limited to the configuration of the embodiment described above, and the effects are not limited to those described above. It goes without saying that the light irradiation device can be variously modified without departing from the scope of the subject matter of the present invention. For example, the constituents, methods, and the like of various modified examples described below may be arbitrarily selected and employed as the constituents, methods, and the like of the embodiments described above, as a matter of course.

Figure 10:
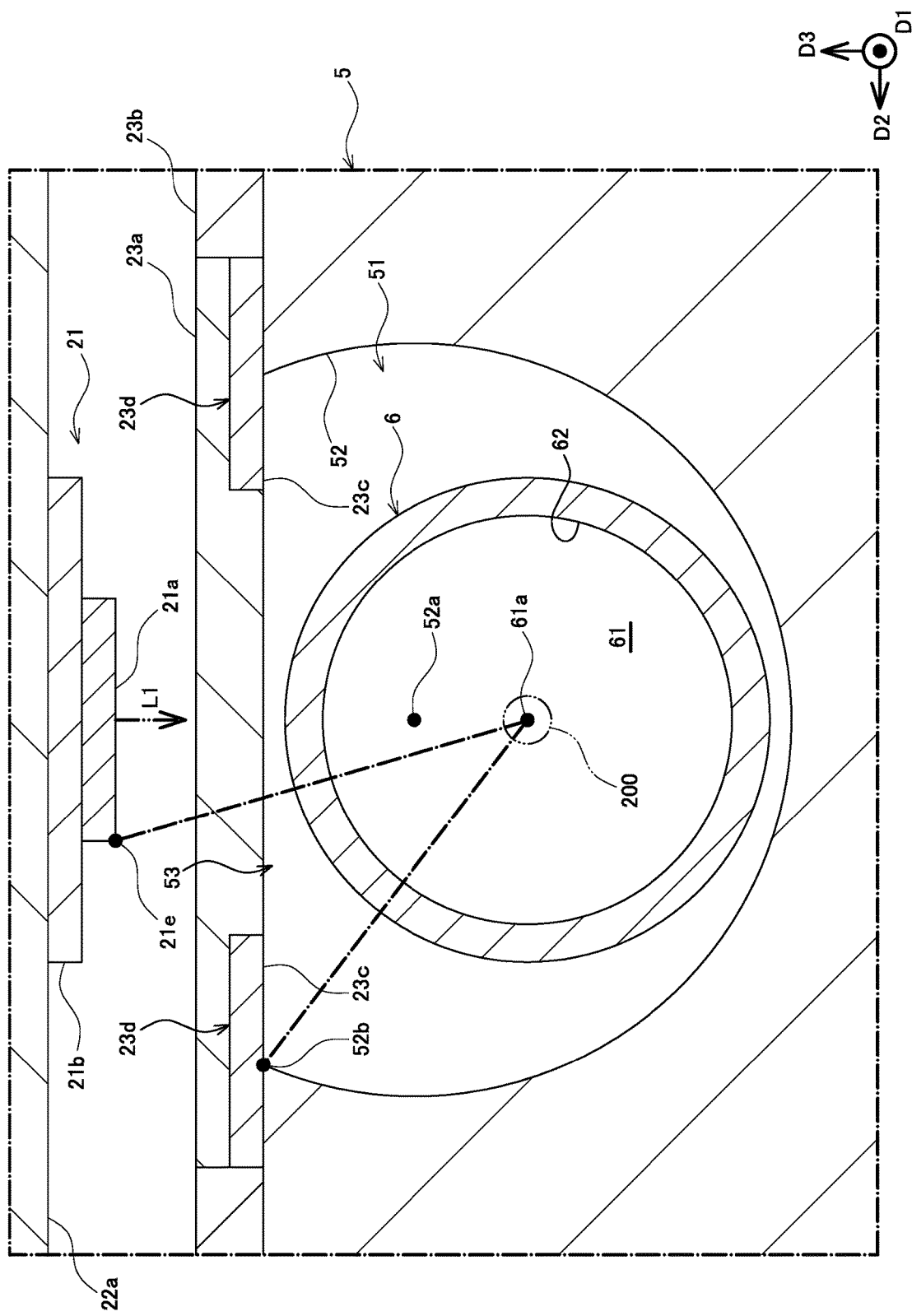
FIG. 10 is a drawing which is a sectional view of the principal components of a light irradiation device associated with another embodiment.

The constitution of light irradiation device 1 associated with the foregoing embodiment is such that the entirety of second reflective portion 21c is arranged between end 52b of first reflective portion 52 and end 21e of light-emitting portion 21a in a direction circumferential with respect to first reflective portion 52. However, the light irradiation device is not limited to such constitution. For example, as shown in FIG. 10, it is also possible to adopt a constitution in which a portion of second reflective portion 23c is arranged between end 52b of first reflective portion 52 and end 21e of light-emitting portion 21a in a direction circumferential with respect to first reflective portion 52.

Figure 11:
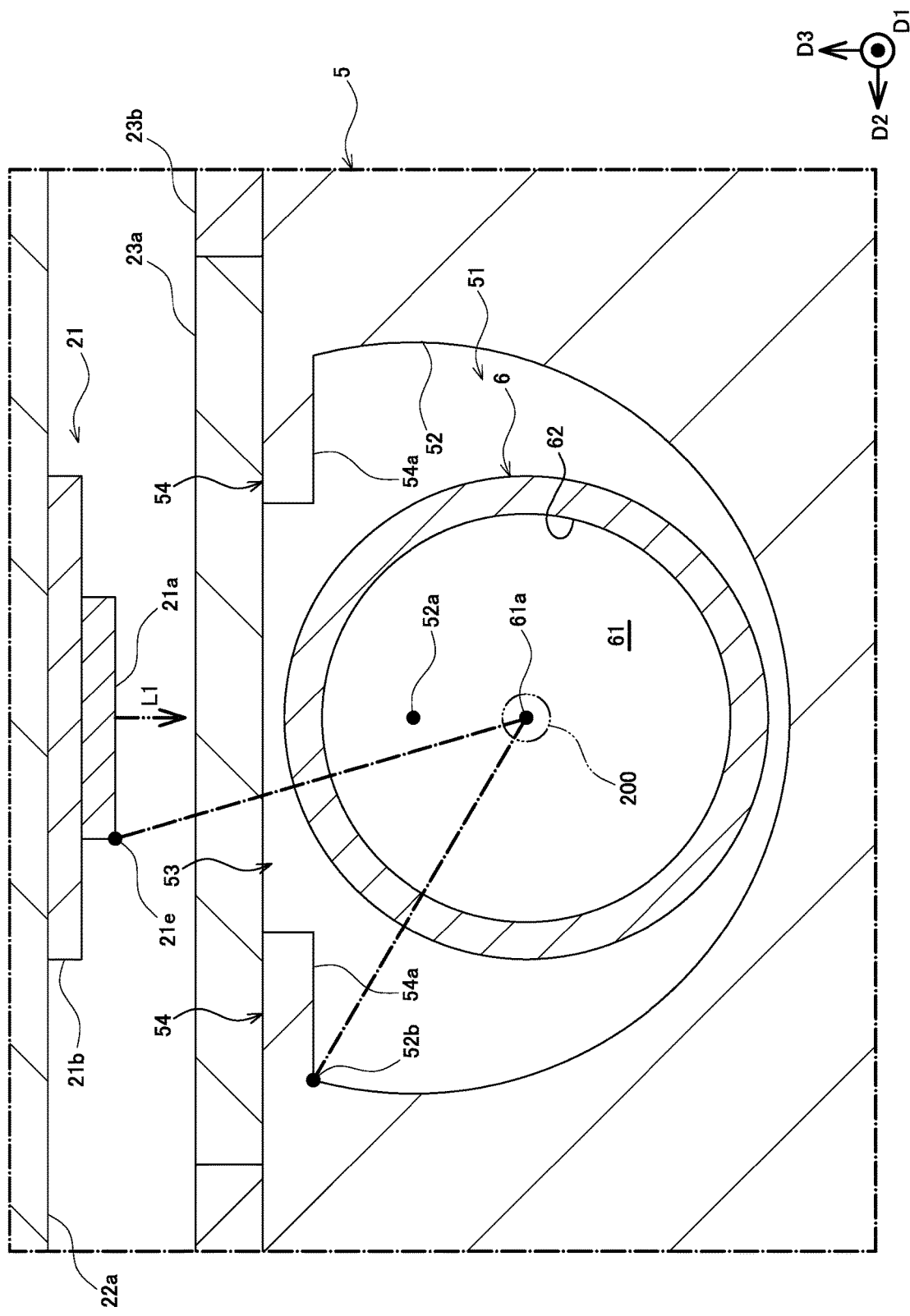
FIG. 11 is a drawing which is a sectional view of the principal components of a light irradiation device associated with yet another embodiment.

Furthermore, the constitution of light irradiation device 1 associated with the foregoing embodiment is such that the member 5 having first reflective portion 52 and the member 2 having second reflective portion 21c are different. However, the light irradiation device is not limited to such constitution. For example, as shown in FIG. 11, it is also possible to adopt a constitution in which the member 5 having first reflective portion 52 and the member 5 having second reflective portion 54a are the same. That is, it is also possible to adopt a constitution in which first reflective portion 52 and second reflective portion 54a are formed in integral fashion.

Furthermore, the constitution of light irradiation device 1 associated with the foregoing embodiment is such that second reflective portion 21c is provided at light source 21. However, the light irradiation device is not limited to such constitution. It is also possible, e.g., as shown in FIG. 10, to adopt a constitution in which second reflective portion 23c is provided at reflector 23d which is present at case 23, and it is also possible, e.g., as shown in FIG. 11, to adopt a constitution in which second reflective portion 54a is provided at convex reflector 54 which is present at main body portion 5.

Figure 12:
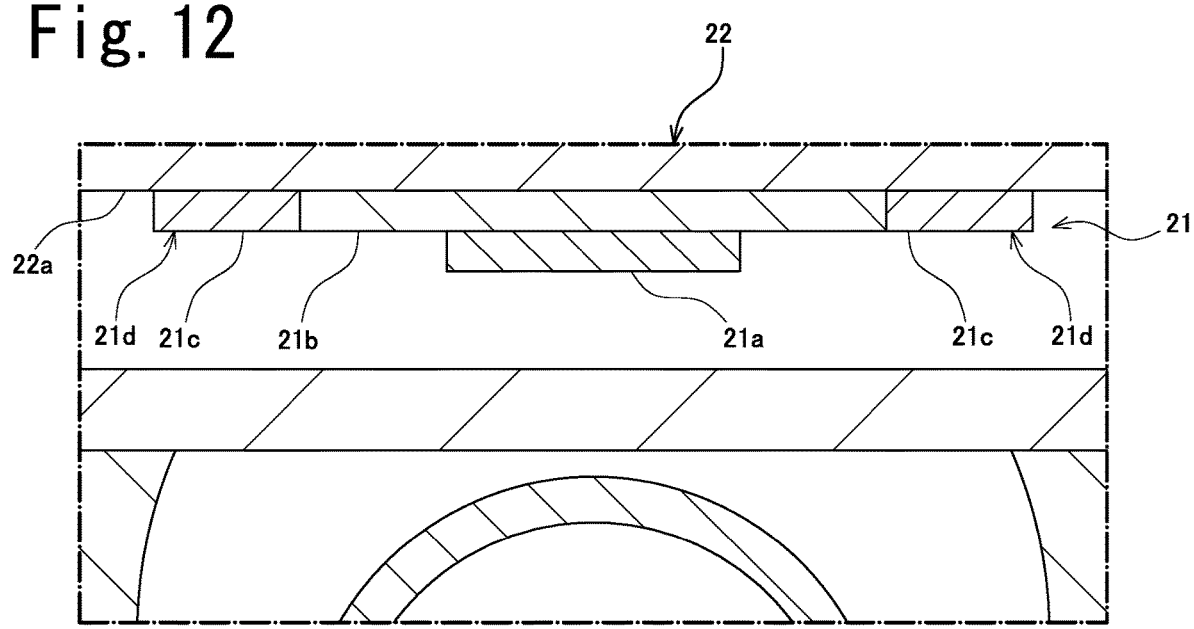
FIG. 12 is a drawing which is a sectional view of the principal components of a light irradiation device associated with yet another embodiment.
Figure 13:
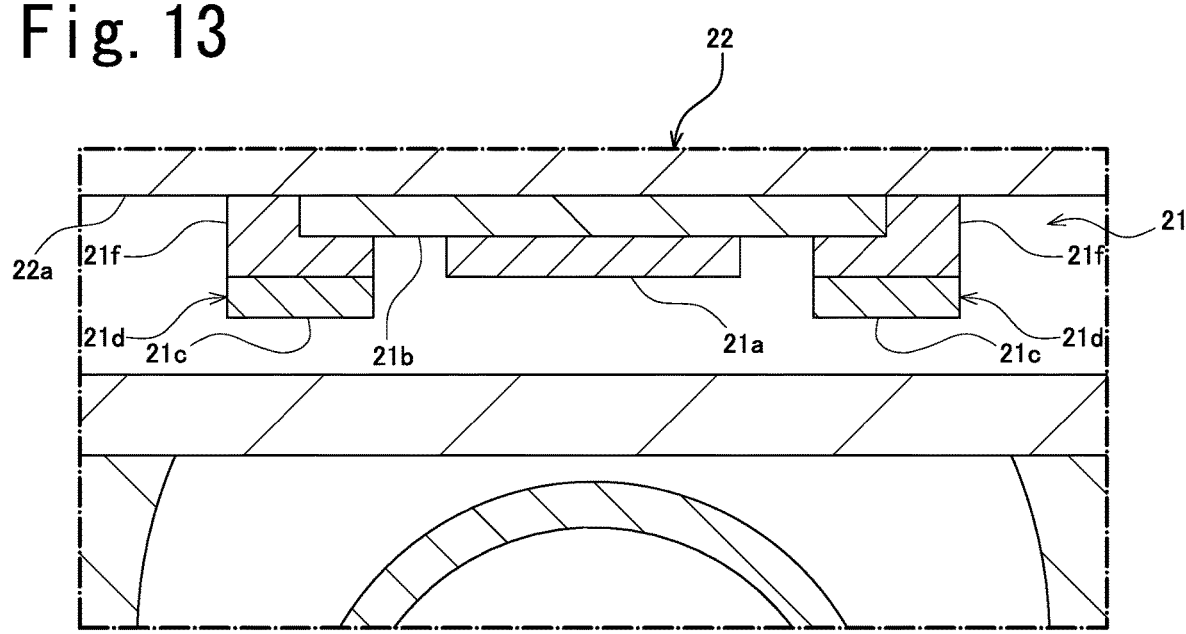
FIG. 13 is a drawing which is a sectional view of the principal components of a light irradiation device associated with yet another embodiment.

Furthermore, the constitution of light irradiation device 1 associated with the foregoing embodiment is such that reflector 21d which has second reflective portion 21c is secured to substrate 21b. However, the light irradiation device is not limited to such constitution. For example, as shown in FIG. 12, it is also possible to adopt a constitution in which reflector 21d which has second reflective portion 21c is secured to light source cooling unit 22 (more specifically, cooling main body 22a). Furthermore, for example as shown in FIG. 13, it is also possible to adopt a constitution in which reflector 21d which has second reflective portion 21c is secured to holder 21f which causes substrate 21b to be held by light source cooling unit 22.

Figure 14:
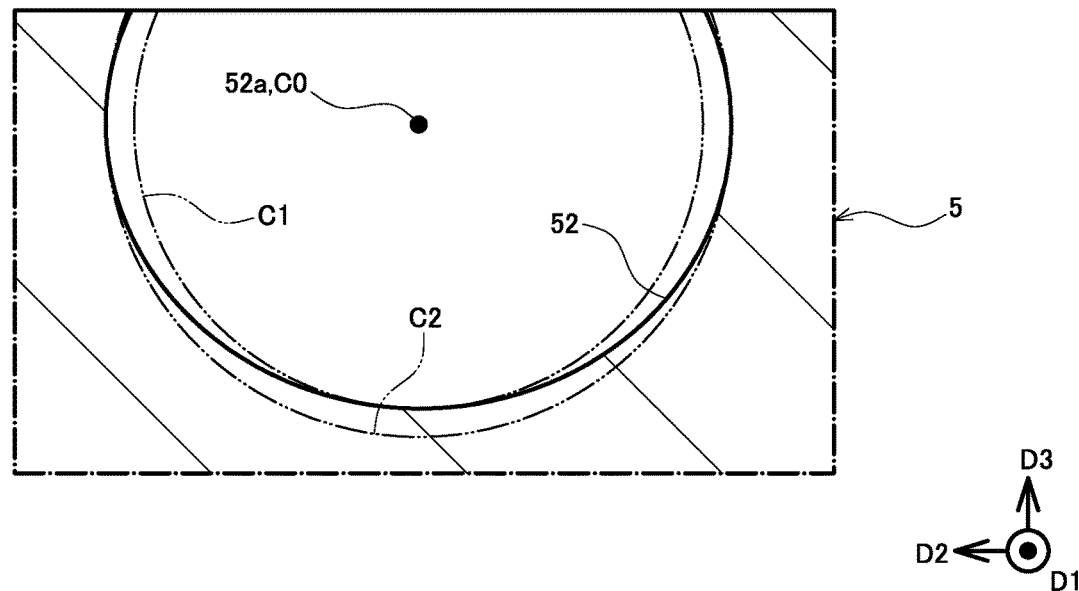
FIG. 14 is a drawing which is a sectional view of the principal components of a light irradiation device associated with yet another embodiment.
Figure 15:
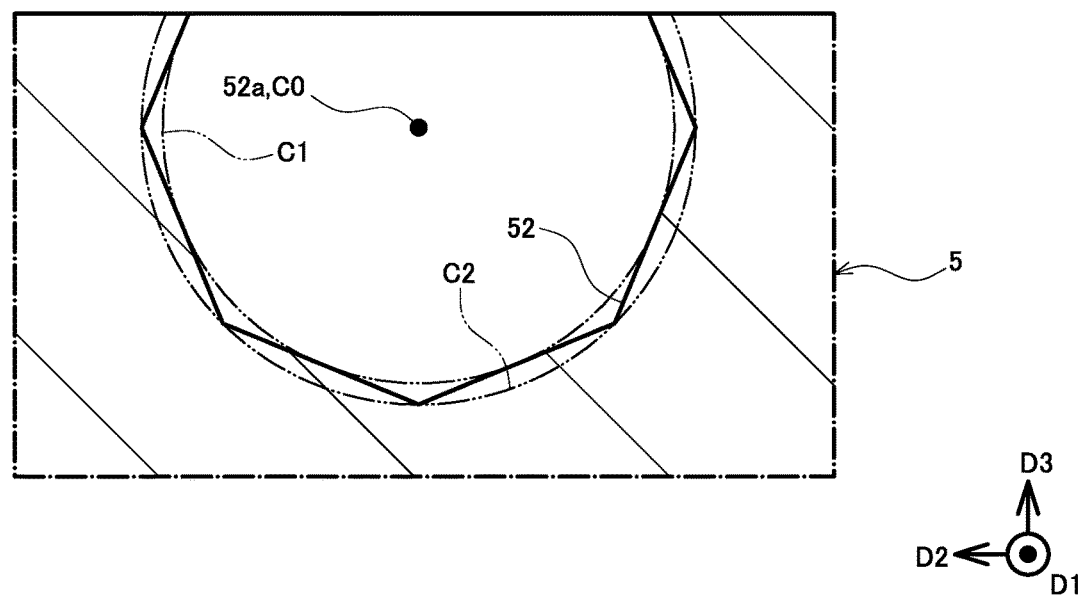
FIG. 15 is a drawing which is a sectional view of the principal components of a light irradiation device associated with yet another embodiment.

Furthermore, the constitution of light irradiation device 1 associated with the foregoing embodiment is such that first reflective portion 52 is formed so as to be substantially arcuate such that the shape thereof is a portion of a true circle. However, the light irradiation device is not limited to such constitution. It is also possible, e.g., as shown in FIG. 14, to adopt a constitution in which first reflective portion 52 is formed so as to be substantially arcuate such that the shape thereof is a portion of an ellipse, and it is also possible, e.g., as shown in FIG. 15, to adopt a constitution in which first reflective portion 52 is formed from a plurality of plane surfaces arranged in substantially arcuate configuration; i.e., formed from a polygon.

In addition, first reflective portion 52 might be formed so as to be of such size as to permit insertion therewithin of wire-like member 200. Furthermore, for example, not only is it possible to adopt a constitution in which first reflective portion 52 is only formed so as to be substantially arcuate such that the shape thereof is a portion of a circle, it is also possible to adopt a constitution in which this is formed so as to be substantially arcuate (i.e., circular) such that the shape thereof is an entire circle.

Where it is said that "a first reflective portion is arranged at a concave inner surface that is formed so as to have a substantially arcuate shape", note that "a substantially arcuate shape" here means a shape which is present in the space between two circles (first circle C1 and second circle C2) having centers C0 at the same location, and for which the relationship between the diameter of the first circle C1 and the diameter of the second circle C2 (which is ≥the diameter of the first circle C1) is such that the following formula is satisfied.

$$100\% \leq (\text{diameter of second circle } C2)/(\text{diameter of first circle } C1) \leq 110\%$$

Furthermore, it is preferred that the following formula be satisfied.

$$100\% \leq (\text{diameter of second circle } C2)/(\text{diameter of first circle } C1) \leq 105\%$$

Note that the location of the center 52a of curvature of the substantially arcuate shape of first reflective portion 52 is the location of the centers C0 of the foregoing respective circles C1, C2 when "(diameter of second circle C2)/(diameter of first circle C1)" is a minimum. Furthermore, for example as shown in FIG. 14, first reflective portion 52 may be such that the shape thereof is a portion of an ellipse that is present in the space between the first circle C1 and the second circle C2.

Figure 16:
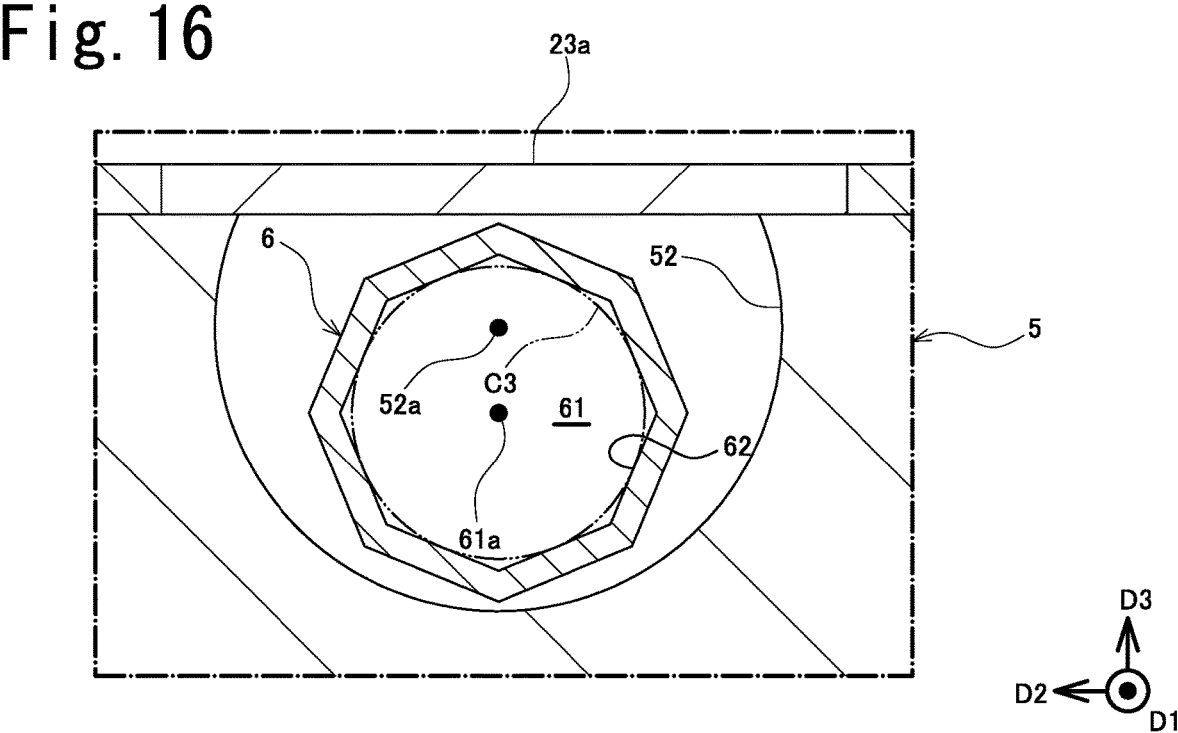
FIG. 16 is a drawing which is a sectional view of the principal components of a light irradiation device associated with yet another embodiment.

Furthermore, the constitution of light irradiation device 1 associated with the foregoing embodiment is such that insertion hole 62 is formed so as to be circular. However, the light irradiation device is not limited to such constitution. It is also possible, for example, to adopt a constitution in which insertion hole 62 is formed so as to be elliptical, and it is also possible, e.g., as shown in FIG. 16, to adopt a constitution in which insertion hole 62 is formed so as to be polygonal. Note that the center 61a of insertion passage 61 is the center of the circle (circle C3 at FIG. 16) inscribed by the surface(s) that constitute insertion passage 61.

Furthermore, the constitution of light irradiation device 1 associated with the foregoing embodiment is such that insertion passage 61 is constituted by insertion hole 62 which is of different constitution as first reflective portion 52. However, the light irradiation device is not limited to such constitution. It is also possible, for example, to adopt a constitution in which the light irradiation device does not comprise such insertion hole 62 but rather, as shown in FIG. 17, first reflective portion 52 constitutes at least a portion of insertion portion 6, this being formed such that center 52a of curvature is offset in eccentric fashion from the center 61a of insertion passage 61.

Figure 17:
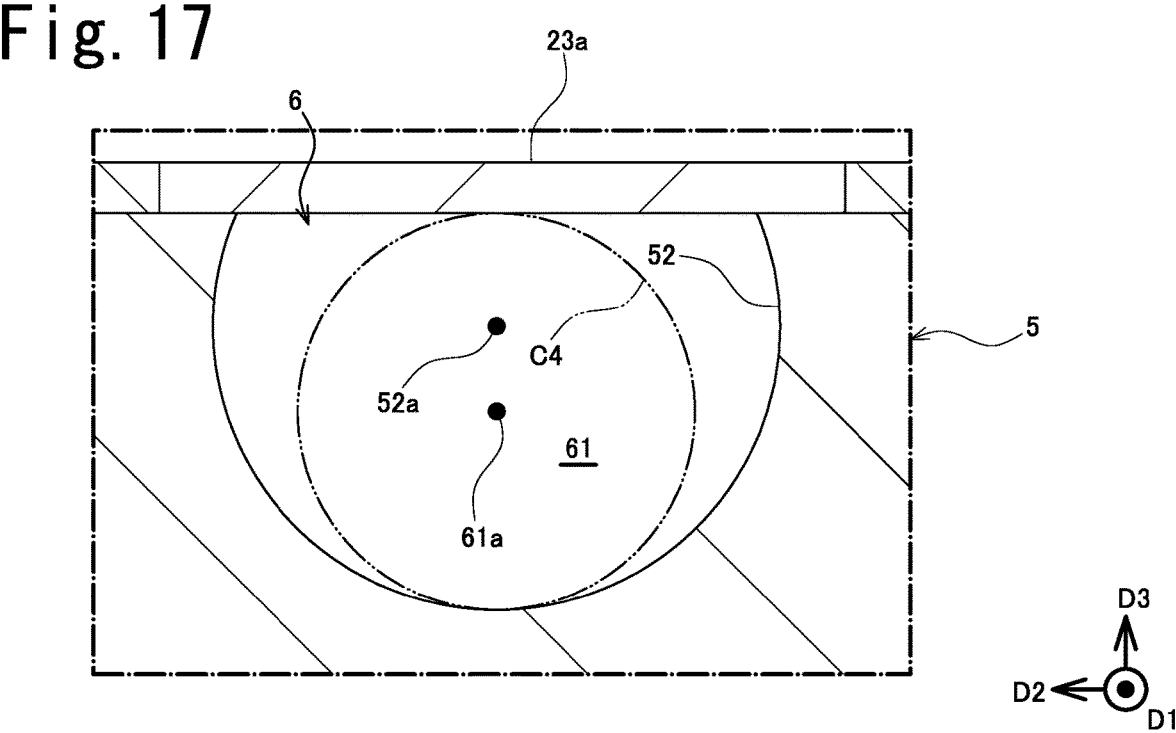
FIG. 17 is a drawing which is a sectional view of the principal components of a light irradiation device associated with yet another embodiment.

Insertion portion 6 associated with FIG. 17 is constituted from first reflective portion 52 and from light transmitting portion 23a of light source unit 2. In addition, insertion passage 61 is constituted from the internal space constituted by first reflective portion 52 and light transmitting portion 23a. Note that the center 61a of insertion passage 61 is the center of the circle C4 inscribed by the surface(s) (the surfaces of first reflective portion and light transmitting portion 23a at FIG. 17) that constitute insertion passage 61.

Furthermore, the constitution of light irradiation device 1 associated with the foregoing embodiment is such that insertion portion 6 is formed in the shape of an elongated cylinder, arrangement thereof at the interior and the exterior of first reflective portion 52 causing insertion hole 62 to be arranged at the interior and the exterior of first reflective portion 52. However, the light irradiation device is not limited to such constitution. It is also possible, for example, to adopt a constitution in which insertion hole 62 is arranged only at the interior of first reflective portion 52, and it is also possible, for example, to adopt a constitution in which arrangement of insertion portion 6 only at peripheral location(s) secured to securing portion 7 causes insertion hole 62 to be arranged only at the exterior of first reflective portion 52.

Furthermore, the constitution of light irradiation device 1 associated with the foregoing embodiment is such that a single light-emitting portion 21a (light source 21) is provided. However, the light irradiation device is not limited to such constitution. For example, it is also possible to adopt a constitution in which a plurality of light-emitting portions 21a (light sources 21) are provided.

Furthermore, the constitution of light irradiation device 1 associated with the foregoing embodiment is such that first reflective portion 52 is arranged such that center 52a of curvature is offset in eccentric fashion from the center 61a of insertion passage 61. However, the light irradiation device is not limited to such constitution. For example, it is also possible to adopt a constitution in which first reflective portion 52 is arranged such that center 52a of curvature coincides with center 61a of insertion passage 61.

Furthermore, the constitution of light irradiation device 1 associated with the foregoing embodiment is such that wire-like member 200 is optical fiber 200. However, the light irradiation device is not limited to such constitution. For example, it is also possible to adopt a constitution in which wire-like member 200 is textile fiber. More specifically, the light irradiation device may be a device that carries out modification of the surface of textile fiber as a result of causing wire-like member 200 which is textile fiber to be irradiated by ultraviolet light.

Furthermore, the constitution of light irradiation device 1 associated with the foregoing embodiment is such that irradiation with light takes place as wire-like member 200 is made to travel through the interior of light irradiation device 1. However, the light irradiation device is not limited to such constitution. For example, it is also possible to adopt a constitution in which irradiation with light takes place while wire-like member 200 is kept stationary with respect to light irradiation device 1.

Furthermore, at light irradiation device 1, a constitution in which the amount by which the center of wire-like member 200 (center 61a of insertion passage 61) ism offset in eccentric fashion from the center 52a of curvature of the substantially arcuate shape of first reflective portion 52 is greater than the radius of wire-like member 200 is preferred, and a constitution in which this is greater than the diameter of wire-like member 200 is more preferred. In accordance with such constitution, because the center 52a of curvature of the substantially arcuate shape of first reflective portion 52 will be located at the exterior of wire-like member 200, this will make it possible to further improve luminous efficiency.

REFERENCE SIGNS LIST 1 light irradiation device
2 light source unit
3 insertion unit
4 connecting portion
4a rotating shaft
5 main body portion
6 insertion portion
7 securing portion
8 main body cooling portion
8a cooling main body
8b inlet portion
8c outlet portion
9 reflector
9a second reflective portion
10 reflector
10a second reflective portion
21 light source
21a light-emitting portion
21b substrate
21c second reflective portion
21d reflector
21e end
21f holder
22 light source cooling unit
22a cooling main body
22b inlet portion
22c outlet portion
23 case
23a light transmitting portion
23b light blocking portion
23c second reflective portion
23d reflector
24 electric power supply unit
24a electric power connection unit
24b terminal block
51 concavity
52 first reflective portion
52a center 52b end
53 opening
54 reflector
54a second reflective portion
61 insertion passage
61a center
62 insertion hole
71 gripping portion
72 gripping portion
100 optical fiber manufacturing apparatus
110 conveyor apparatus
111 conveying member
112 conveying member
120 coating apparatus
200 wire-like member (optical fiber)

The invention claimed is:

1. A light irradiation device comprising:
a first reflective portion that is arranged at a concave inner surface formed so as to have a substantially arcuate shape and that permits a wire-like member to be inserted into an interior thereof;
at least one light-emitting portion that emits light toward the wire-like member from a direction which is circumferential with respect to the wire-like member; and
a second reflective portion that is planar;
wherein at least a portion of the second reflective portion is arranged between an end of the first reflective portion and an end of the light-emitting portion in a direction circumferential with respect to the first reflective portion, and
wherein a reflective surface of the second reflective portion is arranged perpendicular to an optical axis of the light emitted from the light-emitting portion.

2. The light irradiation device according to claim 1, wherein the second reflective portion is arranged such that an angle of intersection thereof with a radial direction of the first reflective portion is greater than 0° and less than 90°.

3. The light irradiation device according to claim 1, comprising an insertion portion comprising an insertion passage formed at an interior thereof, the insertion passage permitting insertion of the wire-like member into the interior of the first reflective portion;
wherein the first reflective portion is arranged such that a center of curvature thereof is offset in eccentric fashion from a center of the insertion passage.

4. The light irradiation device according to claim 3, wherein
the at least one light-emitting portion is a single one thereof; and
the center of curvature of the first reflective portion is offset in eccentric fashion, in a direction of an optical axis of the light emitted from the light-emitting portion, from the center of the insertion passage.

5. The light irradiation device according to claim 4, wherein the center of curvature of the first reflective portion is offset in eccentric fashion, in a direction that causes it to be closer to the light-emitting portion, from the center of the insertion passage.

6. The light irradiation device according to claim 1, wherein the second reflective portion is arranged toward the light-emitting portion from the center of curvature of the first reflective portion along the direction of the optical axis of the light emitted from the light-emitting portion.

7. The light irradiation device according to claim 1, comprising a substrate that supports the at least one light-emitting portion;
wherein the at least one light-emitting portion is secured to a first surface of the substrate; and
the second reflective portion is formed at the first surface of the substrate.

8. The light irradiation device according to claim 7, wherein
there are a plurality of the second reflective portions; and
two of the plurality of the second reflective portions straddle one of the at least one light-emitting portion.

9. The light irradiation device according to claim 1, wherein the first reflective portion and the second reflective portion are integrally formed.

10. The light irradiation device according to claim 9, wherein the end of the first reflective portion is contiguous with an end of the second reflective portion.

11. The light irradiation device according to claim 1, comprising
an insertion unit having the first reflective portion; and
a light source unit having the at least one light-emitting portion and the second reflective portion;
wherein the light source unit is rotatably connected to the insertion unit.

12. The light irradiation device according to claim 11, wherein
the insertion unit comprises a concavity having the first reflective portion at an inner surface thereof;
the concavity comprises an opening to one side in the direction circumferential with respect to the first reflective portion; and
the insertion unit comprises a light transmitting portion opening that covers the opening.

13. The light irradiation device according to claim 12, wherein the at least one light-emitting portion is arranged to cause light to be emitted to pass through the light transmitting portion and directed toward the wire-like member.

14. The light irradiation device according to claim 1, wherein the first reflective portion is a shape which is present in a space between a first circle and a second circle having centers at a same location, and a relationship between a diameter of the first circle and a diameter of the second circle satisfy the formula:

$$100\% \leq \text{(the diameter of the second circle)/(the diameter of the first circle)} \leq 110\%;$$

wherein the diameter of the first circle the diameter of the second circle.

15. The light irradiation device according to claim 14, wherein the first reflective portion is substantially arcuate such that the shape thereof is a portion of a circle.

* * * * *